United States Patent [19]

Broadway et al.

[11] Patent Number: 5,086,555
[45] Date of Patent: Feb. 11, 1992

[54] POWER DRIVEN VALVE ASSEMBLING APPARATUS

[75] Inventors: John M. Broadway, Paragould; Martin L. Koschmann, Jonesboro; William D. Mullikin, Paragould, all of Ark.

[73] Assignee: Arkla Products Company, Paragould, Ark.

[21] Appl. No.: 586,436

[22] Filed: Sep. 21, 1990

[51] Int. Cl.⁵ .................................................. B23P 21/00
[52] U.S. Cl. ........................................ 29/714; 29/709; 29/213.1; 29/237; 29/240; 29/281.5
[58] Field of Search .................... 29/213.1, 237, 240, 29/281.1, 281.5, 283, 709, 714, 217, 240.5

[56] References Cited

U.S. PATENT DOCUMENTS

| | | | |
|---|---|---|---|
| 1,765,825 | 6/1930 | Cork | 29/240 |
| 2,755,840 | 7/1956 | Bartley | 29/240 |
| 3,039,181 | 6/1962 | Sawdey | 229/237 |
| 3,382,559 | 5/1968 | Kopec et al. | 29/240 |
| 3,766,632 | 10/1973 | Goeke | 29/240 |
| 4,553,301 | 11/1985 | Hattori | 29/237 |

Primary Examiner—Echols P. W.
Assistant Examiner—David P. Bryant
Attorney, Agent, or Firm—Arnold J. Ericsen; Gary R. Plotecher; C. Thomas Sylke

[57] ABSTRACT

A power assisted clamping and rotating apparatus for coupling two threadedly engaged members into a third, central member. The central member is held on a support in a fixed position by a clamping mechanism and the other two members are threaded into the central member with rotatable driving mechanisms on each side of central member and being moveable toward the member as they rotate. The rotating side members are in proximity to limit switches which cause rotation of the driving mechanisms to be discontinued when the members are threaded together to a predetermined degree. The limit switches may either be in the form of a laser beam which is interrupted or mechanical or electromechanical switches.

5 Claims, 2 Drawing Sheets

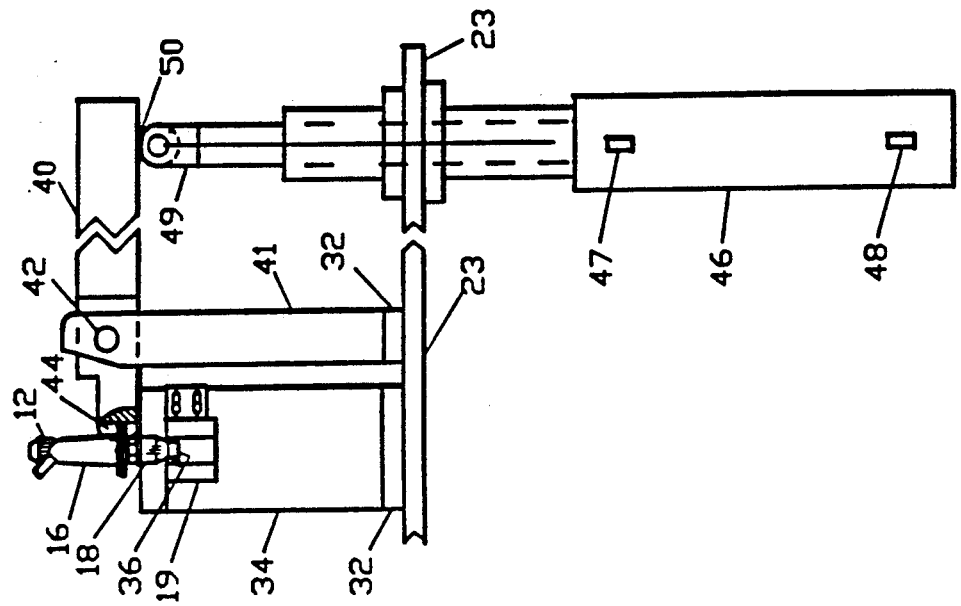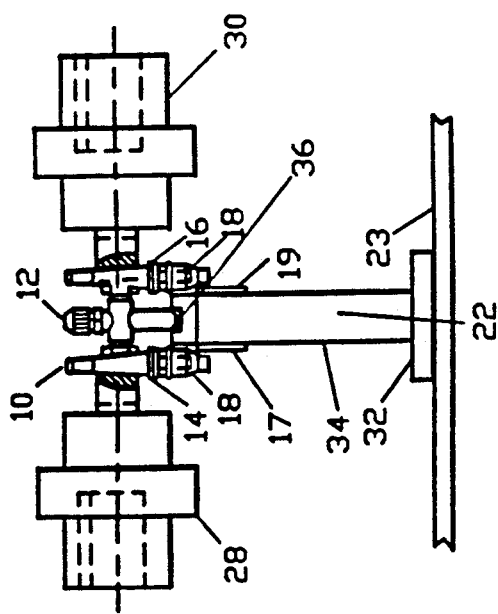

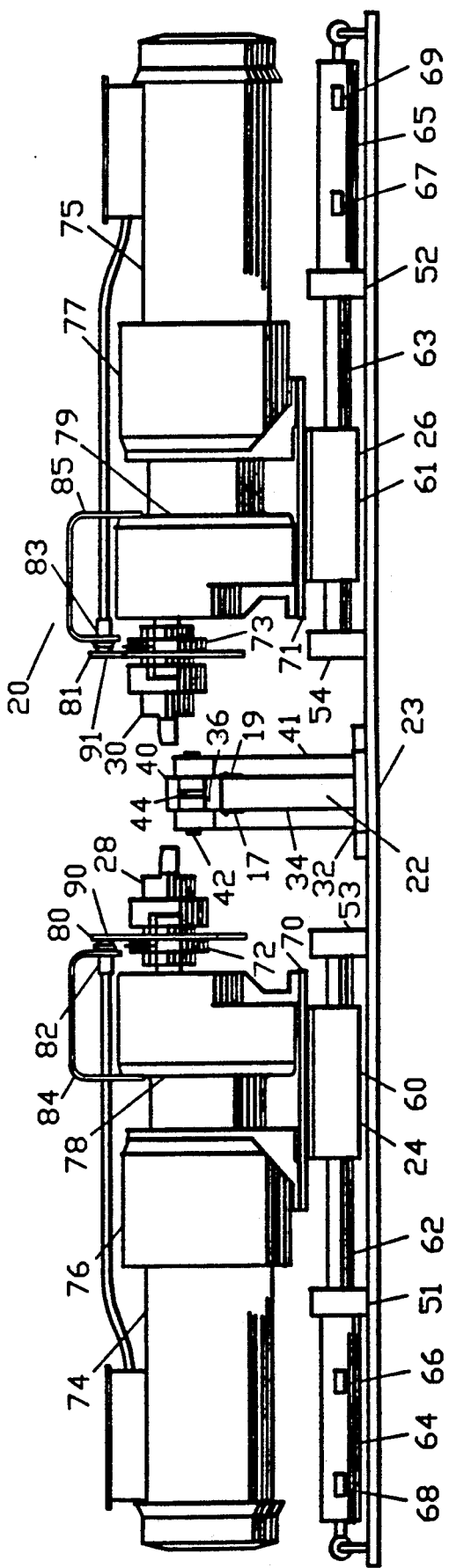

POWER DRIVEN VALVE ASSEMBLING APPARATUS

FIELD OF THE INVENTION

This invention relates to power driven apparatus to assist in the factory assembly of multiple part threaded workpiece components where it is desirable to assemble the parts to a predetermined degree of tightness and to a desired rotational orientation. More particularly the apparatus relates to equipment in which one component of a threadedly engaged assembly is held in a fixed position, while two other components are threaded into the stationary component to a desired degree and to a predetermined fixed orientation relative thereto

BACKGROUND ART

At present, three component valves such as those used for propane gas barbecue grills are commonly assembled by hand in factories. Such labor intensive operations are costly and time consuming.

Previous devices have been devised to assist in rotating threaded objects together to a predetermined level of torque resistance. See for example U.S. Pat. No. 3,382,5592 Kopec, et al. issued May 14, 1968. Such apparatus, however, is not capable of accurately aligning parts to a predetermined orientation because of variations in torque between the components resulting in slight irregularities in the manufacturing processes for those components. A need has thus continued to exist for apparatus capable of completing the assembly of threaded parts to a desired depth and desired final orientation.

An object of the present invention is to provide a power assisted device for completing the assembly of two or more threaded members requiring an accurately controlled predetermined final orientation of the threaded components.

A further object of the invention is to provide novel apparatus for holding one component of a threaded-together assembly in a stationary position, while threading thereon, from opposite sides or directions, other component members. A still further object of the invention is to provide a device wherein the motion of the thread rotating device is controlled by the position of the members being threaded together Another aspect of the invention relates to the provision of such apparatus wherein the amount of rotation of the member being threaded together signals the stoppage of the assembly equipment, so that a predetermined rotational alignment of the members is provided.

These and other objects and advantages are achieved by providing power driven apparatus for assembling two or more threadedly engaged workpiece members to a predetermined degree of threaded coupling and a predetermined orientation which includes, a clamping unit to securely engage and hold one of the threaded members in a fixed rotational position in a cradling member, there being a clamping member having a yoke adapted to pivot against a workpiece component and clamp it in the cradle member. One or more power driven rotatable yoke means are movable toward and away from said clamping unit, the rotatable yoke means having a control means to position them in a predetermined rotational orientation to engage another rotatable workpiece component when the rotatable component is advanced toward the workpiece. Motor means are provided to rotate the driving yoke component to thread said workpiece components together. Means activated by the position of said workpiece and coupled to said drive mechanism are provided to stop the rotation when the workpiece components have been threaded together to a desired degree in a predetermined orientation relative to each other.

The foregoing and other objects and advantages of the present invention will be apparent from the following detailed description and accompanying drawings.

DRAWINGS

FIG. 1 is an elevational front view illustrating a three part valve to be threaded together and held clamped in a stationary clamping component of the apparatus of this invention.

FIG. 2 is a front elevational view of the mechanical components of the apparatus of the present invention.

FIG. 3 is a side view of a valve in a clamping yoke and also showing the activating mechanism of the present invention.

DETAILED DESCRIPTION

Referring to the drawings, numeral 10 designates a composite threaded together workpiece, in this case, a three component valve. Three component valve assembly 10 includes a central manifold component 12 and left and right valve units 14 and 16 which can be threaded into manifold component 12. An extension 18 is placed over the end of each of the valve components 14 and 16 for use in controlling the movement of the apparatus of this invention as will be further explained hereinafter.

As seen in FIGS. 1 and 2 the apparatus of this invention, generally designated by numeral 20, includes a central stationary clamping unit 22. On either side of stationary unit 22 are left and right turning units 24 and 26, respectively. Units 24 and 26 are mounted for sliding movement toward and away from stationary unit 22 and include rotatable drive yokes 28 and 30.

As best seen in FIG. 1, stationary clamping unit 22 includes a base portion 32 which can be clamped to a table or other supporting surface 23. Extending upwardly from the surface of base 32 is a pedestal 34 having an indentation, or cradle 36 adapted to cradle the bottom of the central valve component, or manifold 12. A pivotable clamping yoke 40 is pivotably secured to the upper end of support posts 41 at pivot points 42. The forward edge of clamping yoke 40 has an indentation 44 adapted to fit over and around the central component 12 of the valve assembly 10. As the yoke 40 is pivoted downwardly over the workpiece manifold 12 as seen in FIG. 3, the lower end of the workpiece manifold 12 is firmly held in indentation or cradle 36.

The mechanism for actuating clamping yoke 40 is shown in FIG. 3. A cylinder 46 activating an extendable rod 49 is provided in a vertical orientation to move the lever arm end of the clamping bar 40 upwardly to clamp a workpiece 10 being assembled on a stationary position. Downward movement of rod 49 releases the assembled workpiece 10. Cylinder 46 may be an air cylinder or hydraulically activated cylinder. An upper limit switch 47 stops the extension of rod 49 when it reaches a desired fully extended position A similar lower limit switch 48 stops the motion of the rod when it is fully retracted. As shown, the end of rod 49 is provided with a roller 50 in order to permit raising and lowering of the clamping yoke 40 in a low friction contact with clamping yoke 40 As will be noted from the drawings, upward motion of the piston rod 49 causes downward pivoting of the yoke indentation 44 against the top of the valve preassembly, or other workpiece, thereby causing it to be securely fastened in the valve cradle 36.

The movable turning units 24 and 26 include platforms 60 and 61 which are mounted for motion toward and away from stationary unit 22 on slide rods 62 and 63. Each of these platforms 60, 61 is driven by an air cylinder, 64 and 65 respectively. The movement of the platforms 60, 61 is further controlled by limit switches 66 and 67 which signal the control unit when the drives are fully extended. Similar limit switches 68 and 69 are provided to provide a signal when the point of complete retraction of each of the drives is obtained.

Attached to the platforms 60 and 61 are platforms 70 and 71, respectively. Drive yokes 28 and 30 are mounted on drive shafts 72 and 73 which are rotationally driven by drive motors 74 and 75. Magnetic disc brakes 76 and 77 and gear reducers 78 and 79 are also provided in the rotational drive mechanism. Also attached to the respective drive shaft 72 and 73 are positioning plates 80 and 81, each of which is respectively provided with a one inch square hole or opening 90,91 which can be read by proximity switches 82 and 83 which are mounted to gear reducers 78 and 79 by suitable brackets 84 and 85.

The machine is fitted with a standard electrical panel box (not shown) which houses all electrical components. Included in the enclosure is a Programmable Controller such as a Square D Symac 50 ® controller. Standard relays, contacts, potentiometers, power supplies, etc., all of which are well known to those skilled in the the art are also housed in the enclosure. All of the switches 47, 48, 66, 68, 67 and 69 are wired to the controller to achieve the described mode of operation in conventional fashion, as are microswitches 17 and 19, proximity switches 82 and 83, and anti-tie-down palm button start up switches (not shown).

OPERATION

The valve assemblies or other workpieces are started by hand after application of conventional pipe sealant. The valve stems are positioned in the approximate correct position so that they will be readily engaged by the turning yokes. Verification of the correct rotational alignment of turning yokes 28 and 30 is provided by signals from alignment testers in the form of proximity switches 82 and 83 when they are in alignment with holes 90 and 91 in plates 80 and 81.

A valve stem extension 18 is placed on each stem. The valve preassembly lightly hand threaded together is then loaded into the valve cradle 36. Slide air cylinders 64 and 65 are actuated when the start up cycle is commenced by depression of appropriate start up switches, which are preferably palm button switches of the anti-tie-down type, for reasons of operator safety. Limit switches 66 and 67 signal the control unit when each drive yoke is fully extended. Activation of said limit switches also turns on the power to drive motors 74 and 75. Simultaneously with activation of cylinders 64 and 65, cylinder 46 is activated to pivot holding yoke 44 down over the central workpiece component 12. Once both the clamp yoke limit switch 47 and slide extension switches 66 and 67 are activated, power is supplied to the drive motors 74 and 75 to commence rotation of the yokes 28 and 30. This rotation threads the respective valve components 14 and 16 into the valve manifold 12. After sufficient rotation to cause valve extension 18 to contact microswitches 17 and 19, the drive motors 74 and 75 are caused to be set to a slower motor speed. On the second activation of microswitches 17 or 19 by the valve extension 18, the appropriate drive motor 74 or 75 is stopped. The combined effects of the gear reducers 78 and 79 and magnetic disc brakes 76 and 77 are used to stop the drive yokes 28 and 30. Proper orientation of the workpiece components is verified by signals from alignment testers or proximity switches 82 and 83. Slide cylinders 64 and 65 and clamp yoke cylinder 46 are then all retracted with limit switches 68, 69 and 48 indicating complete retraction. The completed valve assembly 10 is then removed from the valve cradle 36 and another preassembly can be loaded therein and the cycle repeated.

The use of extensions, such as end caps 18 used in connection with the particular workpieces illustrated, can be used as a convenience where the dimensions of the clamping unit and size and shape of the workpieces dictate. The dimensions of such extensions will be determined by the persons skilled in the art dependent on the dimensional relationships between the workpiece and the rotation mechanism. Some workpiece configurations, can, however, make possible the elimination of the need for such extensions. In other words, in such cases, it is possible to place the microswitches 17 or 19 in a location so that they will be engaged by a part of the workpiece itself when it is threaded together to the correct amount.

Also, while switches 17 and 19 have been shown for purposes of illustration, the use of a laser beam can be substituted for said switches. In the case of such beam, the beam is placed in an appropriate location so that it will be interrupted by the movement of the workpiece. An appropriate electrical signal would be generated by such interruption to control the movement of the workpiece components to a desired final orientation.

It will also be noted that the axis of rotation of the turning yokes 28 and 30 should be aligned with the axis of the threads in the workpiece that are to be threaded together. Thus, the height and placement of the components of the apparatus should be adjusted to provide such an alignment in order to assure proper working of the apparatus.

What is claimed is:

1. Power driven apparatus for assembling first and second threadingly engageable workpiece members to a predetermined axial coupling position and predetermined rotational orientation, said apparatus comprising;
 a stationary clamping unit for retention of said first workpiece member, said stationary clamping unit including a cradling member for supporting said first workpiece member and a cooperating pivotally supported yoke member clampingly engageable with a cradled first workpiece member,
 first power means for pivotally actuating said pivotable yoke member towards and away from said cradling member for clamping and releasing of a first workpiece member,
 a rotatable yoke member arranged to retain and rotate a second workpiece member and being longitudinally movable toward and away from said stationary clamping unit, said rotatable yoke member including an integral position indicator,
 rotatable power means for driving said rotatable yoke member, a proximity switch mounted adjacent said rotatable yoke member for detecting said position indicator in order to determine the relative rotational orientation of said workpieces, a position limit switch mounted on said stationary clamping unit for detecting a portion of said second workpiece in order to determine the axial position of said second workpiece with respect to said first workpiece, the rotation speed of said rotatable power means being automatically lowered in response to said detection of said second workpiece, and second power means for providing longitudinal movement of said rotatable yoke means towards and away from the stationary clamping unit.

2. An apparatus according to claim 1, wherein said position indicator includes an opening in a disc member rotatable with said rotatable yoke member.

3. An apparatus according to claim 1, wherein said second workpiece member is provided with an extension for purposes of activating said position limit switch.

4. An apparatus according to claim 1, wherein the first power means includes limit switch means for detection and control of the pivotal movement of said pivotally supported yoke member.

5. An apparatus according to claim 1, wherein the second power means includes limit switch means for detecting and controlling longitudinal movement of said rotatable yoke means with respect to said stationary clamping unit.

* * * * *